United States Patent [19]

Shimizu et al.

[11] Patent Number: 5,587,835
[45] Date of Patent: Dec. 24, 1996

[54] ANTIREFLECTION FILM AND DISPLAY APPARATUS

[75] Inventors: Kazuhiko Shimizu, Fukaya; Takeo Itou, Kumagaya; Hidemi Matsuda, Fukaya, all of Japan

[73] Assignee: Kabushiki Kaisha Toshiba, Kawasaki, Japan

[21] Appl. No.: 391,477

[22] Filed: Feb. 21, 1995

Related U.S. Application Data

[63] Continuation of Ser. No. 280,801, Jul. 26, 1994, abandoned, which is a continuation of Ser. No. 901,147, Jun. 19, 1992, abandoned.

[30] Foreign Application Priority Data

Jun. 19, 1991 [JP] Japan .................................. 3-146438

[51] Int. Cl.⁶ ...................................................... G02B 5/28
[52] U.S. Cl. ............................................................ 359/589
[58] Field of Search .................................... 359/589, 590, 359/885, 890

[56] References Cited

U.S. PATENT DOCUMENTS

| | | | |
|---|---|---|---|
| 2,624,238 | 1/1953 | Widdop et al. | 359/890 |
| 3,151,208 | 9/1964 | Alpert | 359/890 |
| 3,888,646 | 6/1975 | Kuriyama et al. | 359/885 |
| 4,626,071 | 12/1986 | Wada et al. | 359/885 |
| 4,952,025 | 8/1990 | Gunning, III | 359/885 |
| 5,216,542 | 6/1993 | Szczyrbowski et al. | 359/590 |
| 5,245,468 | 9/1993 | Demiryont et al. | 359/589 |

FOREIGN PATENT DOCUMENTS

| | | |
|---|---|---|
| 0263541 | 4/1988 | European Pat. Off. . |
| 0445686 | 9/1991 | European Pat. Off. . |
| 54-34750 | 3/1979 | Japan . |

OTHER PUBLICATIONS

Hecht, Optics, 2nd Ed., Addison-Wesley Pub. 1987 p. 62.
Mouchart et al, "Thin Film Optiical Coatings. 7: Two-Layer Coatings Close to Antireflection", Applied Optics, vol. 18, No. 8, Apr. 1979, pp. 1226–1232.
Azzam et al, "Antireflecting and Polarizing Transparent Bilayer Coatings on Absorbing Substrates at Oblique Incidence", Applied Optics, vol. 24, No. 4, Feb 1985, pp. 519–526.

*Primary Examiner*—Georgia Y. Epps
*Assistant Examiner*—Jordan M. Schwartz
*Attorney, Agent, or Firm*—Cushman Darby & Cushman IP Group of Pillsbury Madison & Sutro LLP

[57] ABSTRACT

An antireflection film includes a first light-transmitting thin film formed on a substrate, and a second light-transmitting thin film formed on the first light-transmitting thin film. The first light-transmitting thin film contains a coloring material, and the antireflection film satisfies $$\lambdaت-50\ nm < \lambda r < \lambda t + 70\ nm$$

where $\lambda r$ is the wavelength at which a spectral reflectance in a visible region is minimized, and $\lambda t$ is the wavelength at which a spectral transmittance in the visible region is minimized.

12 Claims, 7 Drawing Sheets

ANTIREFLECTION FILM AND DISPLAY APPARATUS

This is a continuation of application Ser. No. 08/280,801, filed on Jul. 26, 1994, which was abandoned upon the filing hereof, which is a continuation of application Ser. No. 07/901,147, filed on Jun. 19, 1992, now abandoned.

BACKGROUND OF THE INVENTION

1. Field of the Invention

The present invention relates to an antireflection film for effectively preventing external reflection and a display apparatus having the antireflection film and, more particularly, to an antireflection film having a two-layer structure.

2. Description of the Related Art

A glass plate is generally used as a substrate for a window glass, a show window, or the display surface of a display apparatus. This glass plate sometimes causes specular reflection of ambient light such as light from the sun and light from lighting units. For this reason, reflection often occurs, resulting in a deterioration in transparency. Especially in a display apparatus, if specular reflection occurs on the display surface, an image to be displayed on the display surface overlaps an light source, a scene, and the like located near the apparatus and causing reflection on the display surface so as to cause a considerable deterioration in image quality.

In a conventional method of preventing such reflection, a single-layer or multilayer optical film, i.e., an antireflection film, is formed on the substrate surface to prevent external reflection by using interference of light.

As this antireflection film, a film called a ¼-wave film is known. This ¼-wave film will be described below.

When external reflection is to be prevented by a single-layer antireflection film, the following non-reflection conditions must be satisfied, provided that the refractive index of air is represented by $n_0$; the refractive index of the thin film, $n_1$; the refractive index of the substrate, $n_2$; the thickness of the thin film, $d$; and the wavelength of light which is to be prevented from reflecting, $\lambda$.

$$n_1 d = \lambda/4$$

$$n_1^2 = n_0 n_2 \tag{1}$$

In equations (1), since the thickness of the thin film corresponds to ¼ the wavelength of the light which is to be prevented from reflecting, the film is called a ¼-wave film.

If equations (1) are satisfied, reflective index of the light having the wavelength $\lambda$ can be reduced to zero. If the substrate is composed of glass, $n_2$ is 1.52 and the refractive index $n_0$ of air is 1.00. Therefore, the refractive index $n_1$ of the thin film must be set to be 1.23. The most practicable low-refractive-index material of currently known thin film materials is $MgF_2$. The refractive index of $MgF_2$ is 1.38, which is larger than the refractive index ($n_1$=1.23) defined by the non-reflection conditions. For this reason, it is impossible to completely prevent external reflection by using only a single layer consisting of $MgF_2$.

Under the circumstances, attempts have been made to prevent reflection by forming a two-layer antireflection film consisting of lower and upper layers on a substrate. With this film, the following non-reflection conditions must be satisfied, provided that the refractive index of air is represented by $n_0$; the refractive index of the upper layer, $n_3$; the refractive index of the lower layer, $n_4$; the refractive index of the substrate, $n_2$; the thickness of the upper layer, $d_1$; the thickness of the lower layer, $d_2$; and the wavelength of light which is to be prevented from reflecting, $\lambda$.

$$n_3 d_1 = \lambda/4$$

$$n_4 d_2 = \lambda/4$$

$$n_2 n_3^2 = n_0 n_4^2 \tag{2}$$

According to equations (2), if the substrate is a glass plate, since $n_2$=1.52 and $n_0$=1.00, reflection can be prevented by selecting materials for the lower and upper layers such that a refractive index ratio $n_4/n_3$ is set to be 1.23.

Such a two-layer antireflection film is disclosed in, e.g., Published Unexamined Japanese Patent Application No. 61-10043. This antireflection film has a high-refractive-index film consisting of a co-condensate of an alkoxide of Ti, Zr, or Si as a lower layer, and a low-refractive-index film consisting of a condensate of alkoxysilane or chlorosilane containing a polyfluoroalkyl group as an upper layer.

Figure 1:
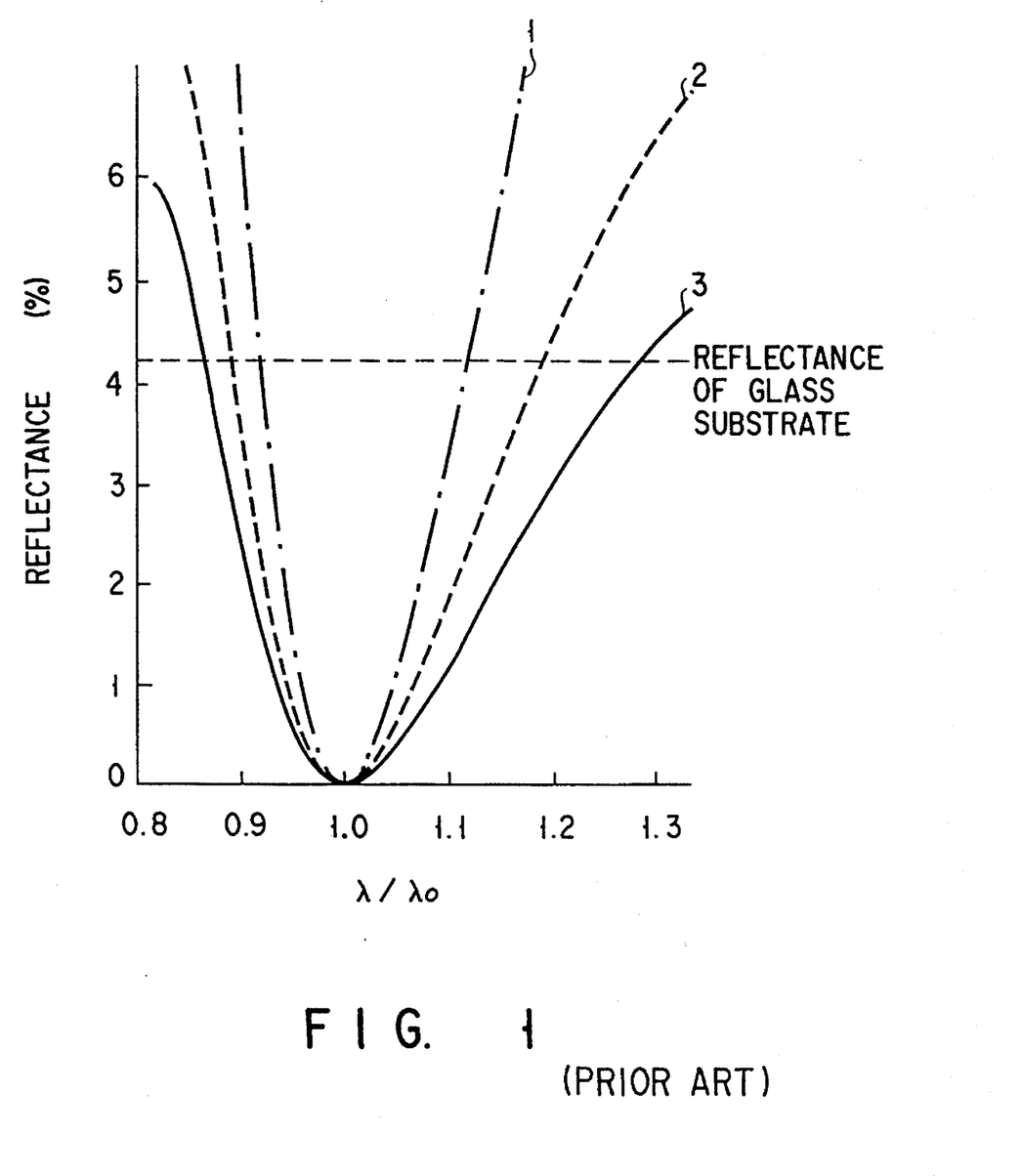
FIG. 1 is a graph showing the relationship between the refractive index and reflectance of a conventional two-layer antireflection film.

Such a two-layer antireflection film can prevent reflection of light rays at specific wavelengths which satisfy the non-reflection conditions but cannot substantially prevent reflection of light rays having wavelengths other than the specific wavelengths. FIG. 1 shows the spectral reflectances of a two-layer antireflection film which is designed such that a combination of the refractive indices of the lower and upper layers is set to satisfy the non-reflection conditions for a glass substrate having a refractive index of 1.52 so as to prevent reflection of a light ray having a wavelength $\lambda_0$. Referring to FIG. 1, a curve 1 is obtained when the refractive index $n_3$ (of the upper layer)=1.55 and the refractive index $n_4$ (of the lower layer)=1.91, a curve 2 is obtained when the refractive index $n_3$=1.45 and the refractive index $n_4$=1.78 and a curve 3 is obtained when the refractive index $n_3$=1.38 and the refractive index $n_4$=1.70. As shown in FIG. 1, each reflectance characteristic curve is relatively steep. That is, the antireflection region in which the reflectance of the substrate having the antireflection film is smaller than that of the substrate itself is relatively narrow. In addition, the antireflection region is widened as lower refractive indices of the upper and lower layers are combined. As described above, the most practicable low-refractive-index material of currently known antireflection film materials is $MgF_2$. With a conventional two-layer film, only an antireflection film having a reflectance characteristic represented by the curve 3 can be expected at best.

As described above, with the conventional two-layer antireflection film, an antireflection effect can only be obtained within a relatively narrow wavelength region. Furthermore, in a region other than a specific wavelength region within which reflection can be prevented, the reflectance may become higher than that of the substrate itself, resulting in glare of the screen. This tendency is conspicuous especially on the short-wavelength side, and bluish glare is caused on the display surface of a display apparatus.

It is known that reflection can be prevented in a wide region by using an antireflection film consisting of three or more layers instead of a two-layer film. More specifically, since the thickness of an antireflection film is determined by the wavelength of light, a multilayer antireflection film consisting of N layers can reduce the reflectances for light rays of N wavelengths. However, an increase in number of layers of an antireflection film leads to an increase in number of processes, a decrease in yield, an increase in cost, and the like, thus posing difficulties in terms of industrial applications.

SUMMARY OF THE INVENTION

The present invention has been made in consideration of the above-described problems in the prior art, and has as its object to provide an antireflection film having a two-layer structure which can prevent reflection in a region wider than that in the prior art.

It is another object of the present invention to provide a display apparatus having such an antireflection film on its display surface.

According to the present invention, there is provided an antireflection film comprising a first light-transmitting thin film formed on a substrate, and a second light-transmitting thin film formed on the first light-transmitting thin film, wherein the first light-transmitting thin film contains a coloring material, and the antireflection film has reflectance and transmittance that satisfy the following inequality $$\lambda t-50 \text{ nm}<\lambda r<\lambda t+70 \text{ nm}$$

where $\lambda r$ is a wavelength at which a spectral reflectance in a visible region is minimized, and $\lambda t$ is a wavelength at which a spectral transmittance in the visible region is minimized.

In addition, according to the present invention, there is provided a display apparatus comprising a display portion having a light-transmitting display surface; and an antireflection film including a first light-transmitting thin film formed on an outer surface of the display surface and a second light-transmitting thin film formed on the first light-transmitting thin film, wherein the first light-transmitting thin film contains a coloring material, and the antireflection film has reflectance and transmittance that satisfy the following inequality $$\lambda t-50 \text{ nm}<\lambda r<\lambda t+70 \text{ nm}$$

where $\lambda r$ is a wavelength at which a spectral reflectance in a visible region is minimized, and $\lambda t$ is a wavelength at which a spectral transmittance in the visible region is minimized.

The coloring material contained in the first light-transmitting thin film of the antireflection film is preferably a pigment having an average particle size of 3 nm to 300 nm.

In addition, the display apparatus is preferably a cathode ray tube or a liquid crystal display apparatus.

According to the present invention, a pigment is added to the lower layer of an antireflection film having a two-layer structure to optimize its spectral transmittance and spectral reflectance, thereby achieving an antireflection effect in a wide region. In addition, reflection in regions deviated from a specific wavelength region as an antireflection region, which causes glare in the prior art, can be suppressed. As a result, a display apparatus having excellent display characteristics can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An antireflection film of the present invention is substantially constituted by an optical film having a two-layer structure consisting of a first light-transmitting thin film formed on a substrate, and a second light-transmitting thin film formed on the first light-transmitting thin film.

The first light-transmitting thin film contains a coloring material.

This antireflection film itself has reflectance and transmittance that satisfy the following inequality, provided that a wavelength at which the spectral reflectance in the visible region is minimized is represented by $\lambda r$, and a wavelength at which the spectral transmittance in the visible region is minimized is represented by $\lambda t$:

$$\lambda t-50 \text{ nm}<\lambda r<\lambda t+70 \text{ nm}$$

It is even more preferable that the wavelengths $\lambda t$ and $\lambda r$ satisfy $$\lambda t-30 \text{ nm}<\lambda r<\lambda t+40 \text{ nm}$$

It is especially preferable that the wavelengths λt and λr be almost equal to each other.

The wavelength λr at which the spectral reflectance of the antireflection film is respectively minimized preferably falls within the range of 550 nm to 630 nm.

Examination by the present inventors revealed that when the lower layer of a two-layer antireflection film was allowed to have a predetermined spectral transmittance characteristic so as to adjust the spectral transmittance characteristic of the antireflection film, the antireflection film exhibited an antireflection effect in a wide region, especially in a wide region on the short-wavelength side, as compared with the prior art. That is, if the wavelengths λt and λr at which the spectral transmittance and spectral reflectance of an antireflection film in the visible region are respectively minimized are set to satisfy λt−50 nm<λr<λt+70 nm, the resultant antireflection film obtains an antireflection effect in a wider region.

An antireflection film having the spectral transmittance and spectral reflectance characteristics defined by the present invention can be formed by mixing an appropriate coloring material in the first light-transmitting thin film, i.e., the lower layer, formed on the substrate.

According to a conventional two-layer antireflection film, neither the lower layer formed on the substrate nor the upper layer formed on the lower layer has the spectral transmittance characteristic that depends on a wavelength of light. Therefore, the spectral transmittance of the conventional two-layer antireflection film is maximized at the wavelength at which the spectral reflectance is minimized. That is, the antireflection film of the present invention has reverse characteristics to those of the conventional two-layer antireflection film.

Figure 2A:
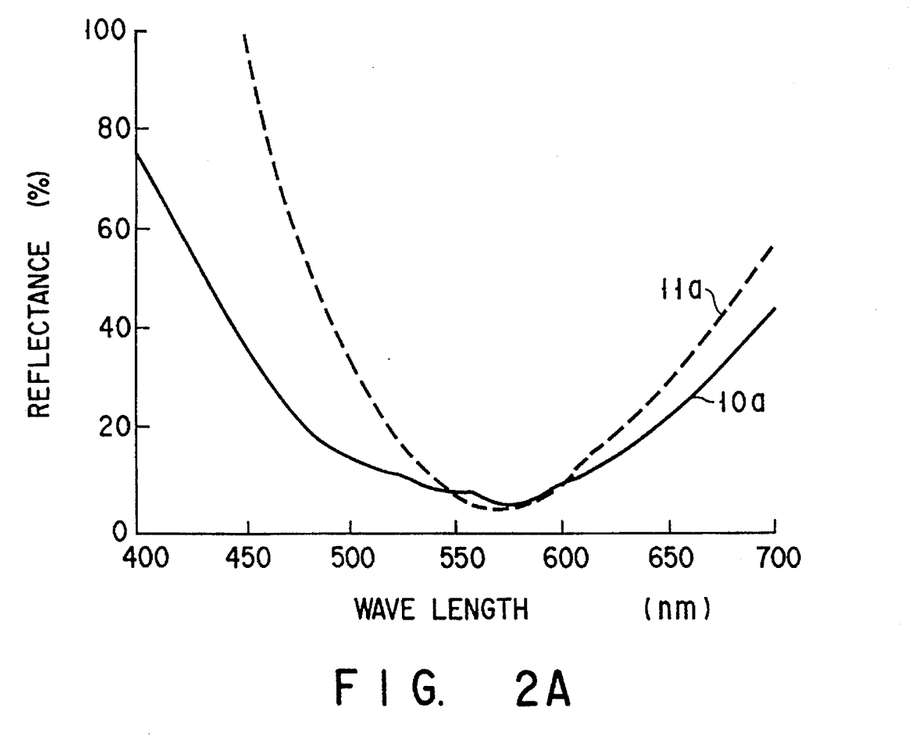
FIGS. 2A and 2B are graphs respectively showing the spectral reflectance and transmittance characteristics of a conventional antireflection film and an antireflection film according to the first embodiment of the present invention.
Figure 2B:
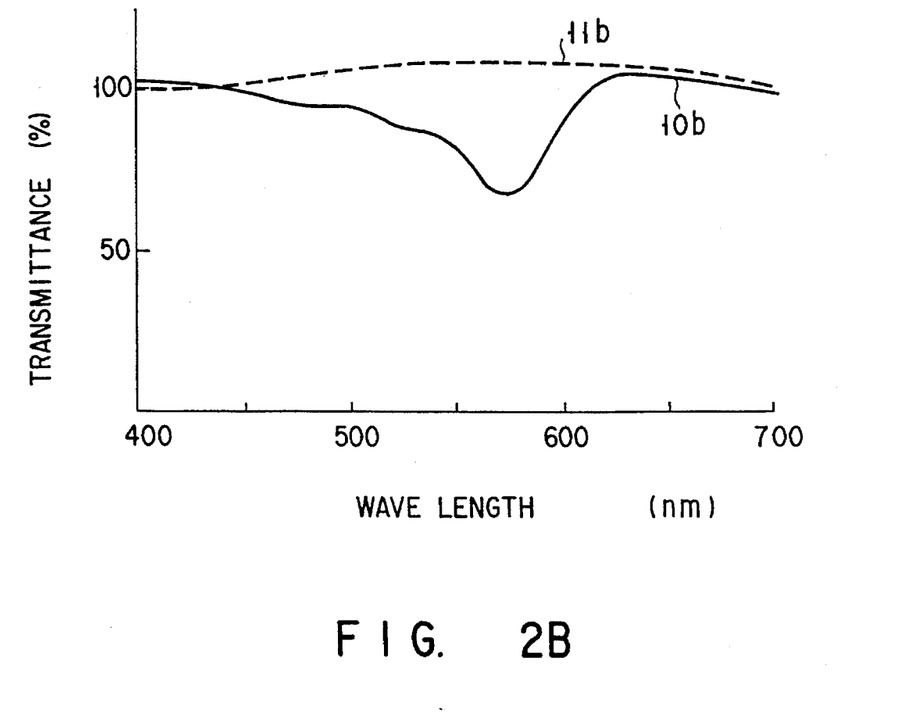
Figure 3A:
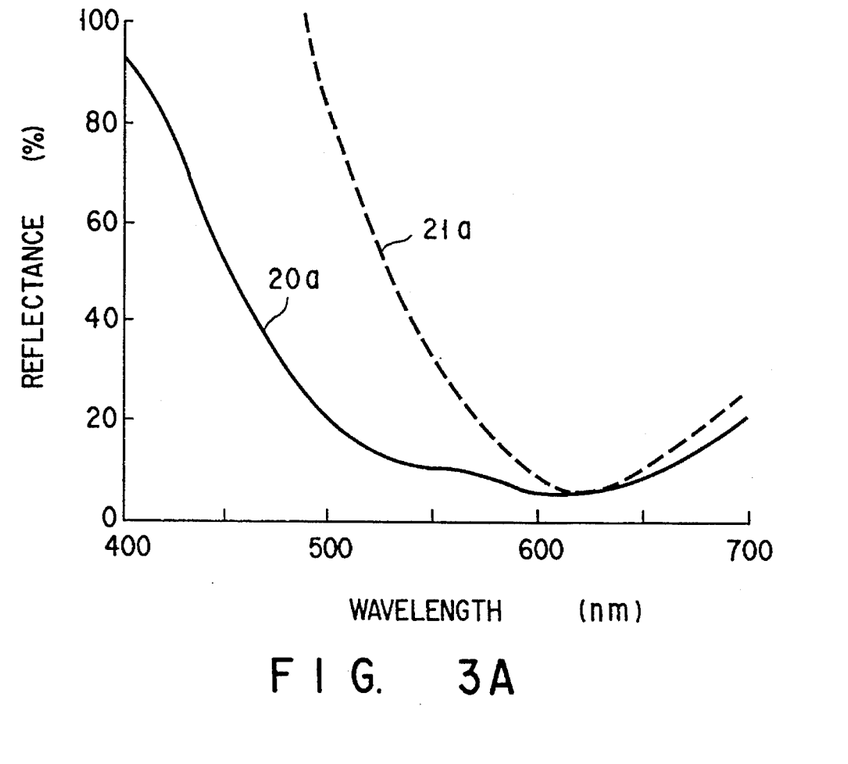
FIGS. 3A and 3B are graphs respectively showing the spectral reflectance and transmittance characteristics of a conventional antireflection film and an antireflection film according to the second embodiment of the present invention.
Figure 3B:
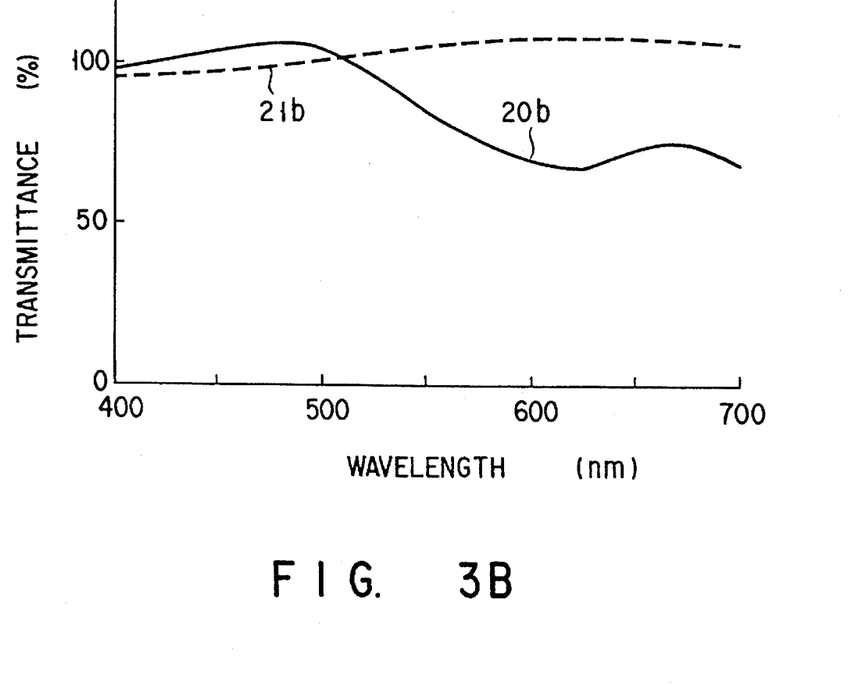

Such characteristics will be described below with reference to FIGS. 2A to 3B. FIGS. 2A to 3B are graphs respectively showing the spectral reflectances and spectral transmittance of antireflection films of the present invention and conventional antireflection films. FIGS. 2A and 2B are graphs respectively showing the characteristics of the antireflection films whose spectral reflectances are minimized at a wavelength of 570 nm. FIG. 2A shows the spectral reflectances. FIG. 2B shows the spectral transmittances. Referring to FIGS. 2A and 2B, solid curves 10a and 10b indicate the characteristics of the antireflection film of the present invention, whereas broken curves 11a and 11b indicate the characteristics of the conventional antireflection film. Similarly, FIGS. 3A and 3B show the comparison between the spectral reflectances and spectral transmittances of the antireflection films whose reflectances are minimized at a wavelength of 620 nm. Referring to FIGS. 3A and 3B, solid curves 20a and 20b show the characteristics of the antireflection film of the present invention; and broken curves 21a and 21b, the characteristics of the conventional antireflection film.

As is apparent from FIGS. 2A to 3B, the antireflection function of each antireflection film of the present invention covers a region wider than that covered by each conventional antireflection film.

Referring to FIGS. 2A to 3B, each antireflection film of the present invention was obtained by forming the following upper and lower layers respectively having predetermined thicknesses. The upper layer was constituted by an $SiO_2$ film obtained by performing hydrolysis and dehydration/condensation of $Si(OC_2H_5)_4$. The lower layer was obtained by mixing a coloring material in a $TiO_2$—$SiO_2$ film, formed by performing hydrolysis and co-condensation of $Ti(OC_3H_7)_4$ and $Si(OC_2H_5)_4$, so as to have a predetermined spectral transmittance.

In this case, the refractive index of the upper layer is about 1.45, and the refractive index of the lower layer without a coloring material is about 1.8. The conventional antireflection films were obtained in the same manner as in forming the antireflection films of the present invention except that they contained no coloring material.

Figure 4:
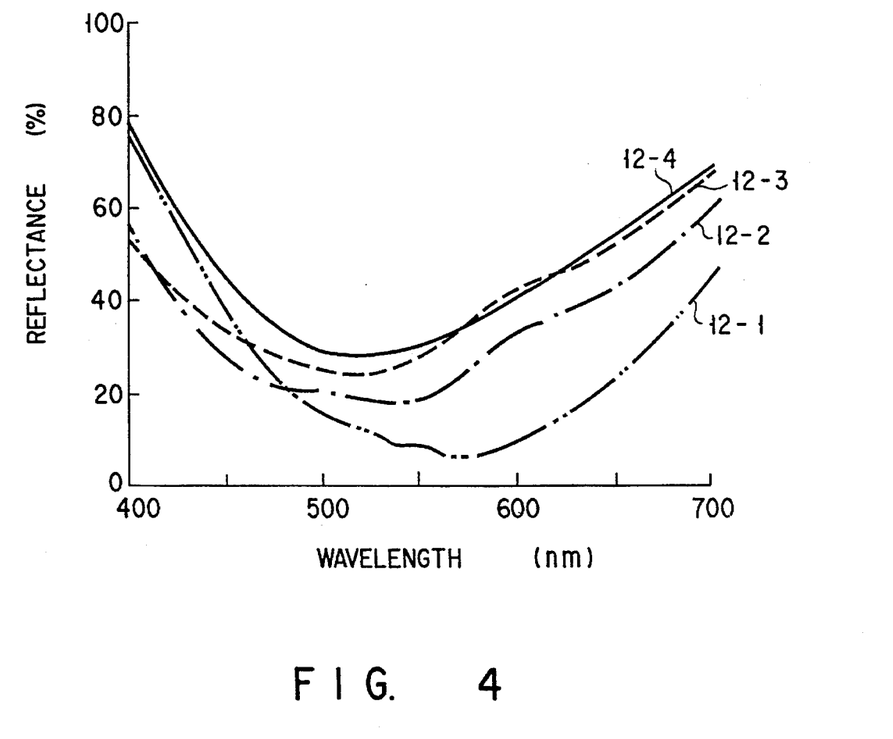
FIG. 4 is a graph showing the spectral reflectance characteristics of a modification of the antireflection film according to the first embodiment of the present invention.
Figure 5:
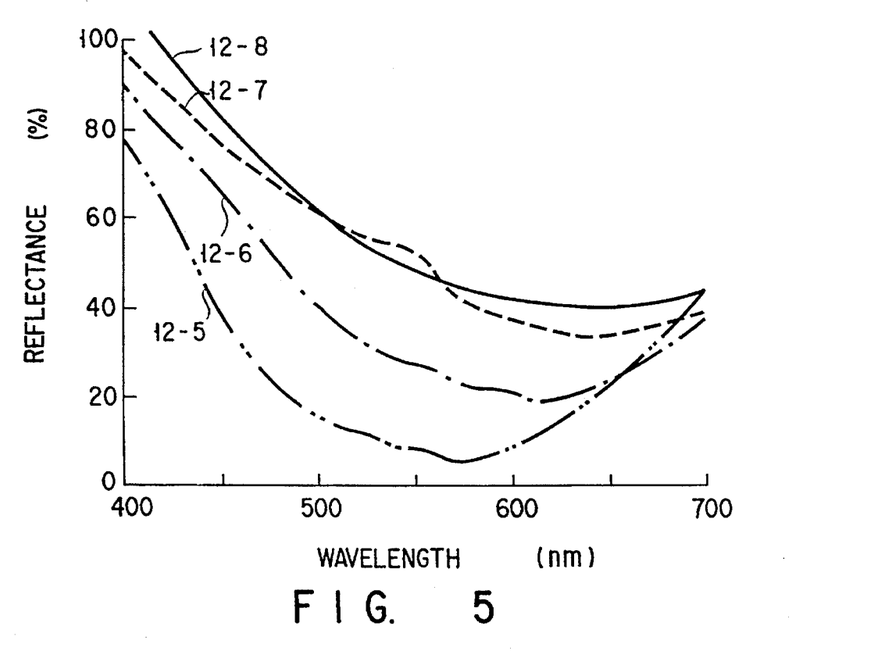
FIG. 5 is a graph showing the spectral reflectance characteristics of a modification of the antireflection film according to the first embodiment of the present invention.

The wavelength at which the spectral reflectance of an antireflection film is minimized is dependent on the thicknesses of the lower and upper layers of the film. FIG. 4 shows changes in spectral reflectance of the antireflection film having the spectral transmittance characteristic shown in FIGS. 2A and 2B as the thicknesses of the lower and upper layers are gradually decreased. Similarly, FIG. 5 shows changes in spectral reflectance of the antireflection film when the thicknesses are gradually increased.

Referring to FIG. 4, a curve 12-1 represents a characteristic of the antireflection film which has an optimum film thickness. With this film, the wavelengths at which the spectral transmittance and the spectral reflectance are respectively minimized are about 570 nm and hence almost coincide with each other. Referring to curves 12-2 and 12-3, the wavelengths at which the spectral reflectances are minimized are 540 nm and 520 nm, respectively. As is apparent from FIG. 4, each of the antireflection films having the characteristics represented by the curves 12-2 and 12-3 has an antireflection region wider than that of a conventional two-layer antireflection film represented by curve 12-4. However, as the difference between the spectral transmittance and spectral reflectance of each antireflection film is increased at a corresponding wavelength at which the reflectance is minimized, the minimum value of reflectance is increased as compared with a conventional two-layer antireflection film. Although not shown, if the difference is further increased, the reflectance is increased.

It is known that if the reflectance of a two-layer antireflection film is increased by decreasing the refractive index of the lower layer by selecting materials for use in the antireflection film, the region having an antireflection effect can be widened. A curve 12-4 in FIG. 4 indicates the spectral transmittance of a conventional antireflection film which is formed such that the minimum reflectance is set to be 520 nm by decreasing the refractive index of the lower layer. The curve 12-3 indicates the spectral transmittance of the antireflection film of the present invention which is formed such that the minimum reflectance is set to be 520 nm without changing the refractive index of the lower layer. The minimum reflectance of the film represented by the curve 12-4 is higher than that of the film represented by the curve 12-3. However, the film represented by the curve 12-4 exhibits almost the same antireflection characteristic as that of the film represented by the curve 12-3 throughout the visible region, i.e., the wavelength range of 400 to 700 nm. If, therefore, the wavelength at which the spectral reflectance is minimized is shifted from the wavelength at which the spectral transmittance is minimized toward the short-wavelength side by 50 nm, there is no significant difference in antireflection effect between the conventional antireflection film and the antireflection film of the present invention. Furthermore, if the wavelength at which the reflectance is minimized is shifted more than that indicated by the curve 12-3, the minimum value of the spectral reflectance of the antireflection film is further increased. In such a case, a higher antireflection effect can be obtained by using the conventional antireflection film.

As is apparent from the above description, the wavelength at which the spectral reflectance is minimized must not be shifted from the wavelength at which the spectral transmittance is minimized toward the short-wavelength side by 50 nm or more. Since the minimum reflectance is preferably set to be 20% or less in terms of an antireflection effect, it is preferable that the difference be limited to 30 nm or less.

Similarly, referring to FIG. 5, a curve 12-5 represents a characteristic of an antireflection film having an optimum film thickness with this film, the wavelengths at which the spectral transmittance and the spectral reflectance are respectively minimized are about 570 nm and hence almost coincide with each other. Referring to curves 12-6 and 12-7, the wavelengths at which the spectral reflectances are minimized are 610 nm and 640 nm, respectively. Similar to the case wherein the film thickness is gradually decreased, as the film thickness is increased, the difference between the wavelengths at which the spectral transmittance and the spectral reflectance are respectively minimized is increased, and the minimum value of reflectance is also increased. A curve 12-8 represents a characteristic of a conventional antireflection film which is formed such that the refractive index of the lower layer is decreased to set the minimum reflectance at a wavelength of 640 nm. The antireflection film represented by the curve 12-8 has almost the same antireflection characteristic as that of the antireflection film represented by the curve 12-7 in the visible region. In addition, if the difference between the wavelengths at which the spectral transmittance and the spectral reflectance are respectively minimized is increased more than that indicated by the curve 12-7, the minimum reflectance is further increased, resulting in a deterioration in antireflection characteristic as compared with the conventional antireflection film.

Therefore, the wavelength at which the spectral reflectance is minimized must not be shifted from the wavelength at which the spectral transmittance is minimized toward the long-wavelength side by 70 nm or more. Furthermore, in order to set the minimum reflectance to be 20% or less, the difference between the two wavelengths is preferably limited to 40 nm or less.

As described above, if the wavelength at which the spectral transmittance of an antireflection film is minimized is represented by $\lambda t$, and the wavelength at which the spectral reflectance is minimized is represented by $\lambda r$, the following inequality needs to be satisfied:

$$(\lambda t - 50)nm < \lambda r < (\lambda t + 70)nm$$

More preferably, the following inequality is satisfied:

$$(\lambda t - 30)nm < \lambda r < (\lambda t + 40)nm$$

The reason why each antireflection film of the present invention can prevent reflection in a wide region as compared with each conventional antireflection film is that the lower layer of the antireflection film having a two-layer structure contains a coloring material by which a predetermined antireflection characteristic can be satisfied.

As described above, a two-layer antireflection film must satisfy the following equations (2):

$$n_3 d_1 = \lambda/4$$

$$n_4 d_2 = \lambda/4$$

$$n_2 n_3^2 = n_0 n_4^2 \qquad (2)$$

According to the present invention, therefore, if the substrate is composed of glass having a refractive index of 1.52, the ratio of the refractive indices of the lower and upper layers is preferably set to be 1.23. If the upper layer is composed of $MgF_2$ which is the most practicable low-refractive-index material, since the refractive index of the upper layer is 1.38, the refractive index of the lower layer is preferably set to be 1.7.

An antireflection effect can be obtained only at a specific wavelength $\lambda$ at which the relation between these refractive index is satisfied. In such a two-layer antireflection film, since the lower layer is composed of a material having a refractive index higher than that of the substrate, reflection in other wavelength regions tends to be enhanced because of the antireflection film.

The lower layer of each antireflection film of the present invention contains a coloring material. The wavelength at which the spectral transmittance of the lower layer containing the coloring material is minimized is equal to or almost equal to the wavelength at which the reflectance of the film is minimized. The refractive index of such a lower layer is maximized in the wavelength region in which the transmittance is minimized or in a region close thereto. In the antireflection film of the present invention, the ratio of the refractive indices of the lower and upper layers is set to be 1.23 in such a region, but the refractive index of the lower layer in other wavelength regions is not so high. For this reason, reflection is not enhanced in regions other than the wavelength region in which reflection is prevented, and the antireflection effect can be ensured in a wider region.

The antireflection film of the present invention has the antireflection effect regardless of the manufacturing method. The lower layer containing a coloring material is preferably formed by coating and drying a mixed solution of a thin film material, e.g., a metal alkoxide, a solvent, a coloring material, and a catalyst if required. In addition, the upper layer can be formed more simply by the above-mentioned method using a metal alkoxide and the like than by deposition or the like. As the coloring material, a dye or a pigment may be used. A pigment is especially preferable.

As the material for the film, a metal alkoxide is most suitable. A metal alkoxide is expressed by a general formula $M(OR)_4$, wherein M is a metal element and OR is an alkoxyl group. For example, alkoxides of Ti, Zr, Si, Al, Zn, Fe, Co, and Ni as metal elements can be used singly or as a mixture thereof. In order to form the lower layer, the mixing ratio of alkoxides of Ti, Zr, Zn, or the like having a relatively high refractive index, as a binder, may be increased. As the material for the upper layer, the specific gravity of an alkoxide of Si may be increased. Alternatively, polymers formed upon condensation of the above-mentioned metal alkoxides may be used. R of the alkoxyl group OR is preferably an alkyl group having 1 to 5 carbon atoms.

Examples of the material for the film is metal alkoxides, e.g., $Ti(OC_2H_5)_4$, $Ti(OC_3H_7)_4$, $Ti(OC_4H_9)_4$, $Zr(OC_2H_5)_4$, $Zr(OC_3H_7)_4$, $Zr(OC_4H_9)_4$, $Si(OCH_3)_4$, $Si(OC_2H_5)_4$, $Al(OC_2H_5)_3$, $Al(OC_3H_7)_3$, $Al(OC_4H_9)_3$, $Zn(OC_2H_5)_2$, and $Zn(OC_3H_7)_2$), materials obtained by substituting part of alkoxyl groups with other functional groups, e.g., a titanate coupling agent and a silane coupling agent, metal chalaets of Ti and Zr, e.g., β-diketones of Ti and Zr, and mixtures thereof.

Note that if a coupling agent is mixed in the lower layer, the antireflection region of the antireflection film of the present invention can be further widened. Examples of the coupling agent are: the silane coupling agents shown in Table 1; the titanate coupling agents shown in Table 2; and the aluminum coupling agent represented by the following chemical formula 1.

Formula (1) (R is alkyl group)

TABLE 1

CH$_2$=CHSiCl$_3$
CH$_2$=CHSi(OR)$_3$
CH$_2$=CHSi(OC$_2$H$_4$OCH$_3$)$_3$

ClC$_3$H$_6$Si(OR)$_2$
             |
             R

ClC$_3$H$_6$Si(OR)$_3$
H$_2$NC$_2$H$_6$Si(OR)$_3$
H$_2$NC$_2$H$_4$NHC$_3$H$_6$Si(OR)$_3$

H$_2$NC$_2$H$_4$NHC$_3$H$_6$Si(OR)$_2$
                     |
                     R

CH$_2$—CHCH$_2$OC$_3$H$_6$Si(OR)$_3$
  \\ /
   O

CH$_2$—CHCH$_2$OC$_3$H$_6$Si(OR)$_2$
  \\ /                    |
   O                      R

CH$_2$=CCOOC$_3$H$_6$Si(OR)$_3$
      |
      R

CH$_2$=CCOOC$_3$H$_6$Si(OR)$_2$
      |              |
      R              R

HSC$_3$H$_6$Si(OR)$_3$

[epoxycyclohexyl]—C$_2$H$_4$Si(OR)$_3$

C$_6$H$_5$NHC$_3$H$_6$Si(OR)$_3$ (R is alkyl group)

TABLE 2

(CH$_3$)$_2$CHOTi(OC$_2$H$_4$NHC$_2$H$_4$NH$_2$)$_3$

CH$_3$CHOTi(OCR)$_3$
   |       ||
   CH$_3$    O

O    O
                   ||   ||
CH$_3$CHOTi[O—P—O—P(OR)$_2$]$_3$
   |           |
   CH$_3$       OH

CH$_3$CHOTi(OC$_2$H$_4$NHC$_2$H$_4$NH$_2$)$_3$
   |
   CH$_3$ (RO)$_4$Ti[P(OR)$_2$OH]$_2$

[ (CH$_2$OCH$_2$CH=CH$_2$)$_2$ ]
[ C$_2$H$_5$CCH$_2$O ]$_4$—Ti[P(OR)$_2$OH]$_2$

TABLE 2-continued

O
        ||
        C—O        O        O
        |     \\    ||       ||
        CH$_2$—O /Ti[O—P—O—P(OR)$_2$]$_2$
                            |
                            OH

CH$_2$—O        O        O
     \\        ||       ||
      /Ti[O—P—O—P(OR)$_2$]$_2$
CH$_2$—O        |
              OH

CH$_3$CHOTiOCOR
   |      |
   CH$_3$  (OCOC=CH$_2$)$_2$
          |
          CH$_3$

O
                       ||
CH$_2$CHOTi(OS—[phenyl]—R)$_3$
   |          ||
   CH$_3$      O CH$_3$CHOTiOCOR
   |      |
   CH$_3$  (OCOCH=CH$_2$)$_2$

[ O        ]
              [ ||       ]
CH$_3$CHOTi [ OP(OR)$_2$ ]$_3$
   |
   CH$_3$

[         CH$_3$       ]
                      [         |          ]
CH$_3$CHOTi—[ O—[phenyl]—C—[phenyl] ]$_3$
   |                   |
   CH$_3$              CH$_3$ ( CH$_3$CHO—Ti[P(OR)$_2$OH]$_2$ )
(    |                        )
(   CH$_3$                    )$_4$ (R is alkyl group)

Upon hydrolysis and dehydration/condensation of one or a mixture of the above-mentioned metal alkoxides and the like, a film of a metal oxide is formed on a substrate. In addition, if a coloring material is mixed in a solution containing this metal alkoxide, and the resultant solution is coated on the substrate, a coloring-material-containing thin film in which the metal oxide contains the coloring material can be formed.

As a solvent for dissolving a metal alkoxide, an alcohol is suitable. Alcohols may be properly selected in consideration of the fact that their viscosities are increased with an increase in number of carbon atoms. Alcohols having 1 to 5 carbon atoms can be generally used. Examples are: isopropyl alcohol, ethanol, methanol, butanol, pentanol, methoxyethanol, ethoxyethanol, propoxyethanol, and butoxyethanol. That is, almost all available alcohols can be used.

Porous films are generally obtained by the above-described method. If, therefore, a dye is used as a coloring material, control of manufacturing conditions is difficult to perform for the following reason. If a solution for an upper layer is coated on a lower layer after a dye is added to the lower layer, the dye in the lower layer may elute to pass through fine holes in the upper layer so as be mixed in the upper layer which is not sufficiently dried yet. In contrast to this, if a pigment is used as a coloring material, since its particle size is larger than the diameter of each hole in the porous film, there is no possibility that the pigment passes through the fine holes. It is apparent that such a problem is not posed if an upper layer is formed by deposition or the like. However, the cost in the coating method is much lower than that in the deposition method. Therefore, a pigment which can be applied to the coating method is preferably used as a coloring material.

Although there are many types of pigments, organic pigments are especially preferable. In order to maintain high transparency of a film, the particle sizes of these pigments are preferably 300 nm or less. If the particle size of a pigment exceeds 300 nm, a deterioration in transparency tends to occur because of scattering of light. In order to prevent elution from a porous film and ensure sufficient resistance to light, a pigment having a particle size of 3 nm or more is preferably used. More preferably, the particle size of a pigment is 5 to 200 nm.

In general, the particle size of a pigment may not be more than a half of a wavelength $\lambda$, that is not more than 200 nm is the case of visible light, to maintain transparency of the film. According to the present invention, since pigments are confined in the film the difference of refractive index between pigment and material of the film is smaller than the difference of refractive index between pigment and the air. As a result, the particle sizes of the pigments may be allowable up to 300 nm to maintain the transparency of the film containing the pigments.

Almost all available pigments can be used as coloring materials. Examples of the organic pigment are: azo-based yellow and red pigments such as Benzidine Yellow and Carmine FB, condensation pigments such as perylene, perylone, dioxazine, thioindigo, isoindolinone, quinophthalon, and quinacridone, and phthalocyanine-based pigments. Examples of the inorganic pigment are: tinanium white, iron oxide, chrome yellow, and cobalt blue. It is apparent that other types of pigments can also be used for the present invention.

The material for the upper layer preferably has a refractive index lower than that of the lower layer. Although a sufficient antireflection effect can be obtained by a thin film consisting of silicon oxide or the like, fluoroalkylsilane or the like may be added to control the refractive index or increase the film strength. Other materials may be added, as auxiliary additives, to the lower or upper layer as long as they satisfy the above-described characteristics of an antireflection film as a whole.

For example, a hygroscopic metallic salt such as $LiNO_3$ or LiCl may be mixed in one or both of the upper and lower layers of the antireflection film of the present invention. With this mixture, the antireflection film is rendered conductive to have an antistatic function. Alternatively, by adding $SnO_2$ or ITO (Indium Tin Oxide) fine particles to one or both of the upper and lower layers of the antireflection film, an antistatic function can be provided for the film.

It is considered that the above-described antireflection film can be effectively applied especially to a display apparatus and the like. For this reason, it is important to more efficiently prevent reflection of visible light. It is considered that the wavelength at which the human eye senses light most strongly, i.e., the wavelength at which the visual sensitivity is high, is 555 nm. Ambient light rays are often heavily distributed at slightly long wavelengths in the visible region. Therefore, in order to effectively prevent reflection of ambient light rays, reflection of light rays having wavelengths 550 nm to 630 nm are mainly prevented. For this reason, the wavelength at which the spectral reflectance of an antireflection film is minimized is preferably set to be 550 nm to 630 nm, respectively.

An example of the display apparatus is an apparatus which allows images to be seen through the display portion including light-transmitting substrate, e.g., a cathode ray tube, a liquid crystal display unit, or the like.

Figure 7:
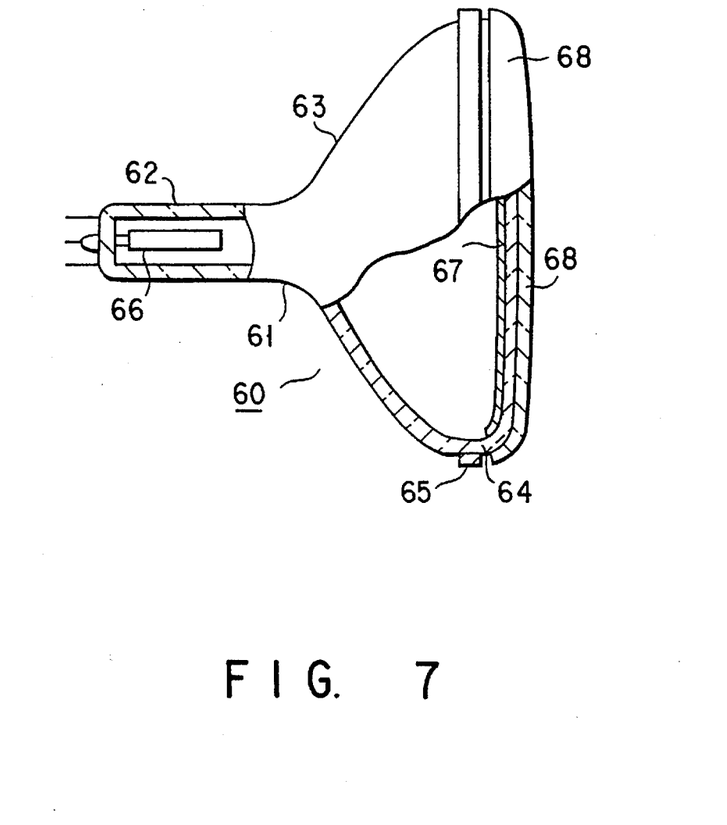
FIG. 7 is a partially cutaway view for explaining the structure of a cathode ray tube according to the present invention.

FIG. 7 is a partially cutaway side view showing a cathode ray tube manufactured on the basis of the present invention. A cathode ray tube 60 has an airtight glass envelope 61 the interior of which is evacuated. The envelope 61 has a neck 62 and a cone 63 continuously extending from the neck 62. In addition, the envelope 61 has a faceplate 64 sealed by a frit glass. An explosion-proof tension band 65 consisting of a metal is wound around the periphery of the side wall of the faceplate 64. An electron gun 66 for emitting electron beams is arranged in the neck 62. A phosphor screen 67 is formed on the inner surface of the faceplate 64. The phosphor screen 67 is constituted by a phosphor layer which is excited by electron beams from the electron gun 66 to emit light. A deflection unit (not shown) is arranged outside the cone 63. The deflection unit serves to deflect electron beams to scan over the phosphor screen.

In addition, a lower layer forming solution containing a metal alkoxide, a pigment, and an alcohol, and an upper layer forming solution containing a metal alkoxide and an alcohol are coated on the outer surface of the faceplate 64 of the cathode ray tube 60. As a result, an antireflection film 68 having a two-layer structure according to the present invention is formed.

Figure 8:
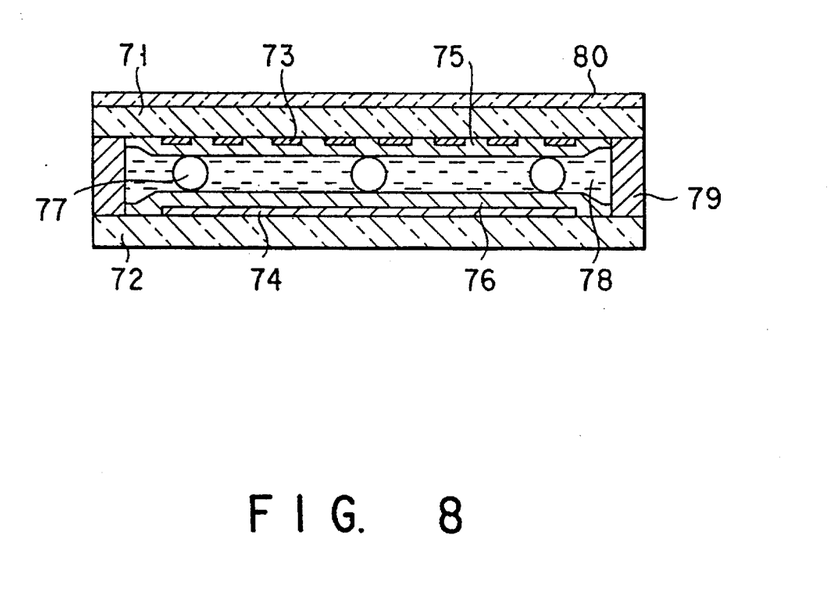
FIG. 8 is a sectional view for explaining the structure of a liquid crystal display apparatus according to the present invention.

FIG. 8 shows a liquid crystal display apparatus according to the present invention. The liquid crystal display apparatus comprises a pair of opposing glass substrates 71 and 72, electrodes 73 and 74 respectively having predetermined patterns, consisting of ITO (indium tin oxide), and formed on the opposing surfaces of the substrates 71 and 72, alignment films 75 and 76 formed on the opposing surfaces of the substrates 71 and 72 to cover the electrodes 73 and 74, a spacer 77 consisting of a thermosetting resin and arranged between the substrates 71 and 72 to be fixed to the alignment films 75 and 76 so as to regulate the gap between the substrates 71 and 72, a liquid crystal 78 sealed between the substrates 71 and 72, and a sealing compound 79 for sealing the peripheral portions of the substrates 71 and 72. An antireflection film 80 is formed on the outer surface of the substrate 71, one of the substrates constituting a display portion base member.

The antireflection film 80 is formed as follows. Surface portions other than the portion on which the antireflection film 80 is formed are sealed. Thereafter, the same film forming solutions as those used for the cathode ray tube are coated on the surface to have a film thickness of 0.1 μm. Finally, the coatings are calcined.

As described above, according to the present invention, a coloring material is added to the lower layer of a two-layer antireflection film to optimize its spectral transmittance and spectral reflectance, thereby achieving an antireflection effect throughout a wide region. In addition, reflection in regions deviated from a specific wavelength region as an antireflection region, which causes glare in the prior art, can be suppressed. As a result, a display apparatus having excellent display characteristics can be provided.

Embodiments of the present invention will be described below.

Embodiment 1

Preparation of lower layer forming solution

A solution A having the following composition was prepared first as a lower layer forming solution.

| A: | Ti(OC$_3$H$_7$)$_4$ (titanium isopropoxide) | 2.5 wt % |
|---|---|---|
| | pigment dispersion 1 | 15 wt % |
| | nitric acid | 0.05 wt % |
| | IPA (isopropylalcohol) | balance |

In this case, the pigment dispersion 1 was obtained by dispersing Hosta Palm Pink E having an average particle size of 20 nm in isopropylalcohol at 2.5 wt %. The mixed solution prepared to have the above composition A was agitated for about one hour to cause a reaction, thus preparing a lower layer forming solution.

Preparation of upper layer forming solution

A solution B having the following composition B was prepared as an upper layer forming solution.

| B: | Si(OC$_2$H$_5$)$_4$ (silicon tetraethoxide) | 5.0 wt % |
|---|---|---|
| | water | 1.0 wt % |
| | nitric acid | 0.05 wt % |
| | IPA (isopropylalcohol) | balance |

After the mixed solution was prepared to have the above composition, the solution was agitated for about one hour to cause a reaction, thus preparing an upper layer forming solution.

Formation of antireflection film

The above-described lower layer forming solution was coated on a glass substrate having a refractive index of 1.52 by dip coating method and was post-dried at 100° C. for 10 minutes to form a lower layer having a thickness of 0.1 μm. Subsequently, the upper layer forming solution was coated on the lower layer and was calcined at 150° C. for 20 minutes to form an upper layer having a thickness of 0.1 μm. The spectral reflectance and spectral transmittance of the two-layer antireflection film obtained in this manner coincided with those shown in FIGS. 2A and 2B. Note that the spectral reflectance of the antireflection film was measured by MCPD-1000 available from Otsuka Electronics k.k. A halogen lamp was used as a light source to perform measurement at an incident angle of 0°, and the reflectance of a portion of the substrate on which no antireflection film was formed was assumed to be 100%. The spectral transmittance was measured by a spectrocolorimeter CM-1000 available from MINOLTA CAMERA CO, LTD. After the sample was placed on a white board, measurement was performed. The measurement value was expressed by the square root of the ratio of the value of the antireflection film to the value of a portion on which no antireflection film was formed.

As is apparent from FIGS. 2A and 2B, the antireflection film of the present invention has a spectral reflectance indicated by the curve 10a and a spectral transmittance indicated by the curve 10b, and exhibits an antireflection effect throughout a wide range as compared with the conventional antireflection characteristic 11a.

Subsequently, the same solutions were coated on the front surface of the faceplate of an assembled 25-inch color cathode ray tube by spin coating. This antireflection film exhibited the same characteristics as the antireflection characteristics shown in FIGS. 2A and 2B. The cathode ray tube having the antireflection film hardly suffered reflection of ambient light from a window, a lighting unit, and the like. In addition, since reflected light became colorless light, a good images were formed without deteriorating in color reproduction property. With these effects, good images were formed.

Embodiment 2

Preparation of lower layer forming solution

A solution C having the following composition was prepared first as a lower layer forming solution.

| C: | Ti(OC$_3$H$_7$)$_4$ (titanium isopropoxide) | 2.5 wt % |
|---|---|---|
| | pigment dispersion 2 | 15 wt % |
| | nitric acid | 0.05 wt % |
| | IPA (isopropylalcohol) | balance |

In this case, the pigment dispersion 2 was obtained by dispersing Heliogen Blue EP-7S having an average particle size of 10 nm in isopropylalcohol at 2.5 wt %. The mixed solution prepared to have the above composition was agitated for about one hour to cause a reaction, thus preparing a lower layer forming solution.

Formation of antireflection film

An antireflection film was formed on a substrate by using a solution B as an upper layer forming solution as in Embodiment 1. The same coating method, conditions, and film thickness as those in Embodiment 1 were set. The antireflection film obtained in this manner had the same characteristics as those shown in FIGS. 3A and 3B. It is apparent that the antireflection film has a spectral reflectance indicated by the curve 20a and a spectral transmittance indicated by the curve 20b and exhibits an antireflection effect in a wide wavelength region as compared with the prior art, similar to Embodiment 1.

The same antireflection film as described above was formed on the outer surface of the faceplate of a cathode ray tube by spin coating. This antireflection film had the same characteristics as those shown in FIGS. 3A and 3B. The cathode ray tube having the antireflection film exhibited excellent characteristics, similar to Embodiment 1.

Embodiment 3

Preparation of lower layer forming solution

A solution D having the following composition was prepared first as a lower layer forming solution.

| D: | Ti(OC$_3$H$_7$)$_4$ (titanium isopropoxide) | 2.5 wt % |
|---|---|---|
| | Zr(OC$_4$H$_9$)$_4$ (zirconium butoxide) | 0.5 wt % |
| | pigment dispersion 3 | 15 wt % |
| | nitric acid | 0.01 wt % |
| | IPA (isopropylalcohol) | balance |

In this case, the pigment dispersion 3 was obtained by dispersing a perylene-based organic pigment having an average particle size of 30 nm in isopropylalcohol at 2.5 wt %. The mixed solution prepared to have the above composition D was agitated for about one hour to cause a reaction, thus preparing a lower layer forming solution.

Preparation of upper layer forming solution

A solution E having the following composition was prepared as an upper layer forming solution.

| E: | $Si(OC_2H_5)_4$ (silicon tetraethoxide) | 4.5 wt % |
|---|---|---|
| | $CF_3Si(OCH_3)_3$ | 0.5 wt % |
| | water | 1.0 wt % |
| | nitric acid | 0.05 wt % |
| | IPA (isopropylalcohol) | balance |

After the mixed solution was prepared to have the above composition, the solution was agitated for about one hour to cause a reaction, thus preparing an upper layer forming solution.

Formation of antireflection film

An antireflection film having upper and lower layers, each having a thickness of about 0.1 µm, was formed on a substrate following the same coating method and conditions as those in Embodiment 1. The antireflection film obtained in this manner had the same characteristics as those shown in FIGS. 6A and 6B.

Figure 6A:
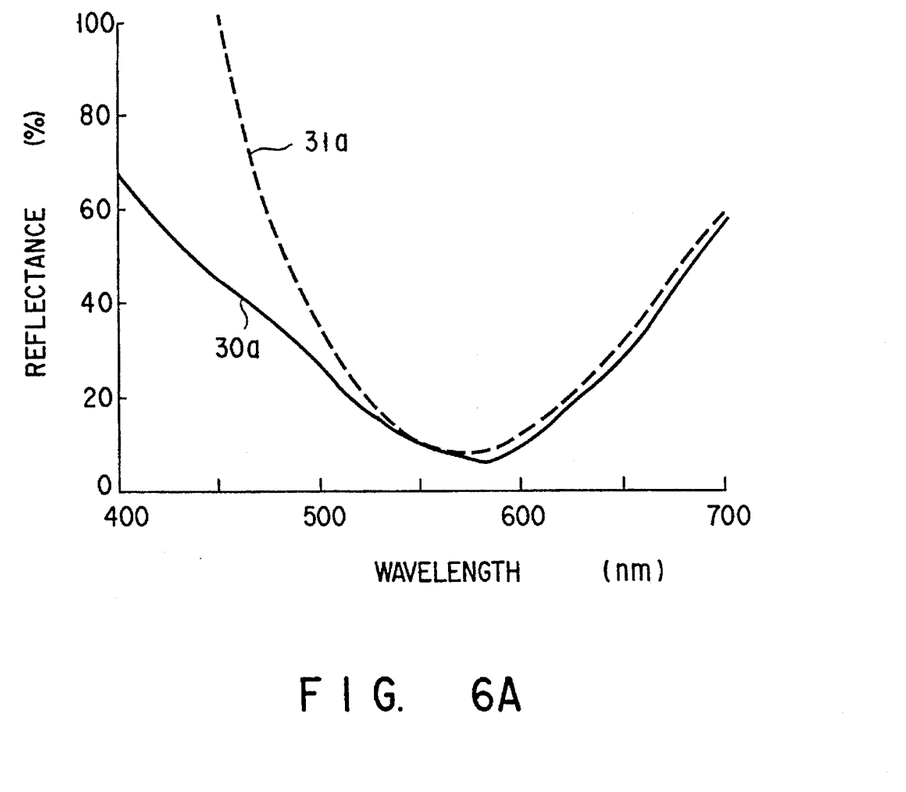
FIGS. 6A and 6B are graphs respectively showing the spectral reflectance and transmittance characteristics of a conventional antireflection film and an antireflection film according to the third embodiment of the present invention.
Figure 6B:
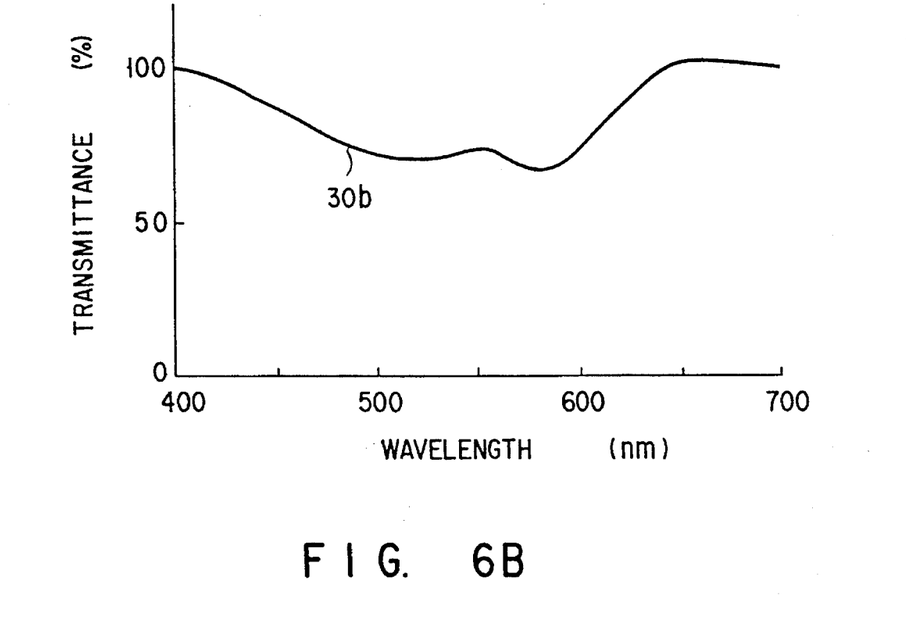

It is apparent that the antireflection film has a spectral reflectance indicated by the curve 30a and a spectral transmittance indicated by the curve 30b and exhibits an antireflection effect in a wide wavelength region as compared with the prior art represented by a curve 31a, similar to above-described embodiments.

When the same antireflection film was formed on the outer surface of a liquid crystal display apparatus, the antireflection film has the same characteristics as those indicated by FIGS. 6A and 6B. Therefore, similar to Embodiments 1 and 2, the display apparatus hardly suffered reflection of ambient light from a window, a lighting unit, and the like. In addition, since reflected light became colorless light, a deterioration in color reproduction property was prevented. With these effects, good images were formed.

Embodiment 4

In each embodiment described above, a pigment is mixed in a lower layer. However, if a coupling agent is mixed in a lower layer together with a pigment, an antireflection effect can be obtained in a wider region. A case wherein a pigment and a coupling agent are mixed in a lower layer will be described below.

Figure 9:
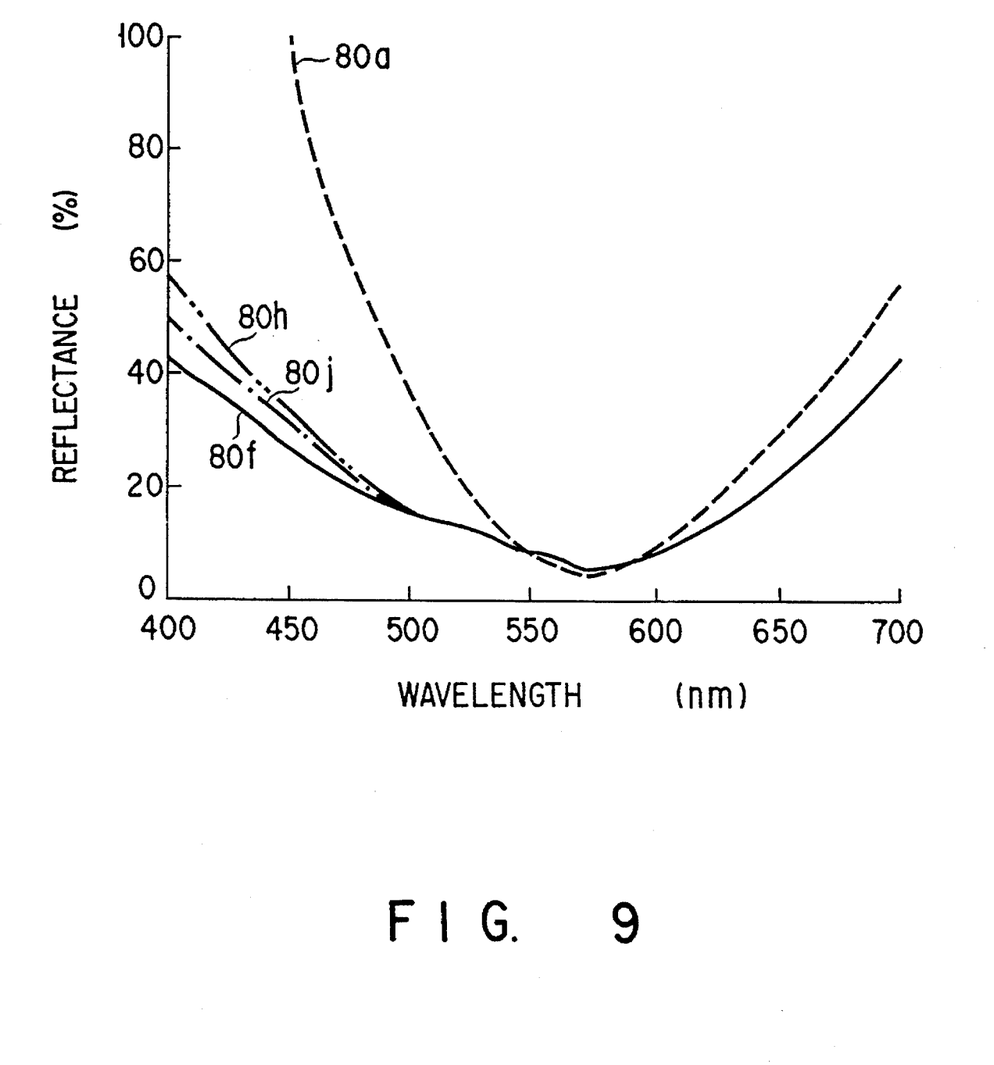
FIG. 9 is a graph showing the spectral reflectance characteristics of an antireflection film according to the fourth embodiment of the present invention.

A mixed solution having the composition shown in Table 3 was left to stand at room temperature for 30 minutes. The solution was then coated on a substrate to form a lower layer. The lower layer was calcined at 100° C. for five minutes. The pigment dispersion in Table 3 was identical to the one used in Embodiment 1. Subsequently, a solution having the following composition was prepared and coated on the lower layer to form an upper layer. The upper layer was then calcined at 150° C. for five minutes. FIG. 9 shows the spectral reflectance characteristics of the antireflection film formed in this manner. Referring to FIG. 9, curves 80a and 80f to 80h respectively correspond to compositions a and f to h in Table 3. In addition, the spectral transmittance characteristics of the antireflection film formed in this manner is similar to that of the antireflection film shown in FIG. 2B.

TABLE 3

| Composition of under layer forming solution | | | | |
|---|---|---|---|---|
| | a | f | g | h |
| Titanium tetraisopropoxide (wt %) | 2.0 | 2.0 | 2.0 | 2.0 |
| Pigment dispersing solution 1 (wt %) | — | 8.0 | 8.0 | 8.0 |
| Silane coupling agent $N_2NC_2H_4NHC_3H_6Si(OCH_3)_3$ (wt %) | — | 0.8 | — | — |
| Titanate based coupling agent $(CH_3)_2CHOTi(OC_2H_4NHC_2H_4NH_2)_3$ (wt %) | — | — | 0.8 | — |
| Aluminum based coupling agent (wt %) | — | — | — | 0.8 |
| Isopropyl alcohol (wt %) | balance | balance | balance | balance |

$$(CH_3)_2CHO \diagdown \diagup O-C \diagup^{CH_3}_{\diagdown} $$
$$\quad Al \qquad CH$$
$$(CH_3)_2CHO \diagup \diagdown O-C \diagdown_{OR}$$

| Composition of upper layer forming solution: | |
|---|---|
| silicon tetraethoxide | 4.0 wt % |
| hydrochloric acid | 1.5 wt % |
| water | 1.0 wt % |
| isopropylalcohol | balance wt % |

This antireflection film has the same characteristics as those obtained in Embodiment 3 and has a wider antireflection region than that of the prior art.

Although the present invention has been described with reference to the particular embodiments, the antireflection characteristics of an antireflection film are to be properly set in accordance with characteristics required for a base member on which the film is to be formed, and hence are not limited to those in the embodiments. In addition, combinations of antireflection films and display apparatuses are not limited to those in the above embodiments.

Additional advantages and modifications will readily occur to those skilled in the art. Therefore, the invention in its broader aspects is not limited to the specific details, representative devices, and illustrated examples shown and

What is claimed is:

1. An antireflection film coating comprising:
   a substrate having an incident side surface on which unfiltered light is incident and an exit side surface on the opposite side of the substrate;
   a first light-transmitting thin film, containing a coloring material therein, having a reflection side and an incident side, said reflection side contacting said incident side surface of said substrate, said reflection side reflecting said unfiltered light; and
   a second light-transmitting thin film formed on said incident side of said first light-transmitting thin film, on which said unfiltered light is directly incident;
   wherein said antireflection film coating has reflectance and transmittance characteristics that satisfy the relationship $$\lambda t-50 \ nm < \lambda r < \lambda t+70 \ nm$$

where $\lambda r$ is a wavelength at which a spectral reflectance in a visible region is minimized, and $\lambda t$ is a wavelength at which a spectral transmittance in the visible region is minimized.

2. An antireflection film coating according to claim 1, wherein the wavelengths $\lambda t$ and $\lambda r$ further satisfy the relationship $$\lambda t-30 \ nm < \lambda r < \lambda t+40 \ nm.$$

3. An antireflection film coating according to claim 1, wherein the wavelength $\lambda r$ at which the spectral reflectance of said antireflection film is minimized falls within a range defined by $$550 \ nm < \lambda r < 630 \ nm.$$

4. An antireflection film coating according to claim 1, wherein said coloring material is a pigment having an average particle size of 3 nm to 300 nm.

5. An antireflection film coating according to claim 1, wherein said second light-transmitting thin film is formed from a metal alkoxide.

6. A display apparatus which has an antireflection film coating comprising:
   a display portion, including a light-transmitting substrate having an incident side surface on which unfiltered light is incident and an exit side surface on the opposite side of the substrate;
   a first light-transmitting thin film, containing a coloring material therein, having a reflection side and an incident side, said reflection side contacting said incident side surface of said substrate, said reflection side reflecting said unfiltered light; and
   a second light-transmitting thin film formed on said incident side of said first light-transmitting thin film, on which said unfiltered light is directly incident; wherein
   said antireflection film coating has reflectance and transmittance characteristics that satisfy the relationship $$\lambda t-50 \ nm < \lambda r < \lambda t+70 \ nm$$

where $\lambda r$ is a wavelength at which a spectral reflectance in a visible region is minimized, and $\lambda t$ is a wavelength at which a spectral transmittance in the visible region is minimized.

7. A display apparatus according to claim 6, wherein the wavelengths $\lambda t$ and $\lambda r$ further satisfy the relationship $$\lambda t-30 \ nm < \lambda r < \lambda t+40 \ nm.$$

8. A display apparatus according to claim 6, wherein the wavelength $\lambda r$ at which the spectral reflectance of said antireflection film is minimized falls within a range defined by $$550 \ nm < \lambda r < 630 \ nm.$$

9. A display apparatus according to claim 6, wherein the coloring material is a pigment having an average particle size of 3 nm to 300 nm.

10. A display apparatus according to claim 6, wherein said display apparatus is a cathode ray tube.

11. A display apparatus according to claim 6, wherein said display apparatus is a liquid crystal display apparatus.

12. A display apparatus according to claim 6, wherein said second light-transmitting thin film is formed from a metal alkoxide.

* * * * *